(12) United States Patent
Kluge et al.

(10) Patent No.: US 7,516,559 B2
(45) Date of Patent: Apr. 14, 2009

(54) DEVICE FOR THE CHECKING AND MEASUREMENT OF THE JOURNAL BEARING CLEARANCE ON THE RUDDER SHAFT OF A RUDDER FOR WATER-BORNE CRAFT

(75) Inventors: Mathias Kluge, Hamburg (DE); Dieter Plappert, Hamburg (DE)

(73) Assignee: Becker Marine Systems GmbH & Co. KG, Hamburg (DE)

( * ) Notice: Subject to any disclaimer, the term of this patent is extended or adjusted under 35 U.S.C. 154(b) by 230 days.

(21) Appl. No.: 11/526,139

(22) Filed: Sep. 22, 2006

(65) Prior Publication Data

US 2007/0094881 A1 May 3, 2007

(30) Foreign Application Priority Data

Oct. 31, 2005 (DE) .................. 20 2005 017 135 U
Dec. 13, 2005 (DE) .................. 20 2005 019 626 U

(51) Int. Cl.
*G01B 3/00* (2006.01)

(52) U.S. Cl. ......................................... 33/542; 33/501

(58) Field of Classification Search ................... 33/542, 33/501, 465, 531–532, 558.3, 544.2, 544.5, 33/556, 559, 558.2
See application file for complete search history.

(56) References Cited

U.S. PATENT DOCUMENTS

| | | | | | |
|---|---|---|---|---|---|
| 2,500,137 A | * | 3/1950 | Poulton | .................. | 33/534 |
| 2,520,934 A | * | 9/1950 | Hoy | .................. | 33/471 |
| 3,995,373 A | * | 12/1976 | Brumbelow | .................. | 33/783 |
| 4,462,166 A | * | 7/1984 | Furlong | .................. | 33/416 |
| 4,536,960 A | * | 8/1985 | Muti | .................. | 33/783 |
| 4,744,151 A | * | 5/1988 | Wisniewski | .................. | 33/501 |
| 5,309,644 A | * | 5/1994 | Robinson et al. | .................. | 33/293 |
| 7,322,252 B1 | * | 1/2008 | Rodgers | .................. | 73/862.08 |
| 7,347,002 B2 | * | 3/2008 | Foege | .................. | 33/783 |
| 2003/0226272 A1 | * | 12/2003 | Finefield | .................. | 33/542 |
| 2005/0005467 A1 | * | 1/2005 | Hannel | .................. | 33/542 |

* cited by examiner

*Primary Examiner*—G. Bradley Bennett
*Assistant Examiner*—Tania C Courson
(74) *Attorney, Agent, or Firm*—Friedrich Kueffner

(57) ABSTRACT

A device (100), for the checking and measurement of the journal bearing clearance between the outer bearing on the rudder shaft (25) of a rudder for water-borne craft and the inner bearing (32) on the rudder trunk (20) corresponding with the outer bearing (31), is characterized by a measurement rail (70) made of a springy elastic material having internal stiffness, which can be introduced by means of a guide rail (60), provided with a grip-type handle (61), into the gap between the outer bearing and the inner bearing and hence into the clearance measurement region, with a measurement probe (80) located at its free end (70*a*) for the clearance width measurement, wherein the measurement rail (70) with the measurement probe (80) with a prescribed thickness (a) are exchanged for measurement rails with measurement probes with other thicknesses until the achievement of an agreement of the clearance width with the thickness of a measurement rail (70) with the measurement probe (80).

13 Claims, 12 Drawing Sheets

PRIOR ART

PRIOR ART

PRIOR ART

DEVICE FOR THE CHECKING AND MEASUREMENT OF THE JOURNAL BEARING CLEARANCE ON THE RUDDER SHAFT OF A RUDDER FOR WATER-BORNE CRAFT

BACKGROUND OF THE INVENTION

The invention concerns a device for the checking and measurement of the journal bearing clearance on the rudder shaft of a rudder for water-borne craft and the inner bearing on the rudder trunk corresponding with the outer bearing.

PRIOR ART

The clearance in the journal bearing region between the rudder shaft of a rudder for water-borne craft and the rudder trunk is subject to regular checks in which the rudder shaft is subjected to swivelling movements about its lengthwise axis, and in which the residual clearance is then measured. These checking measurements of the clearance are undertaken on ships that are lying in dock. An underwater check by divers on ships that are on the water is not possible.

The object of the present invention is to create a device for the checking and measurement of the journal bearing clearance for rudders of water-borne craft that can be used underwater so that divers can undertake the check and the measurement of the clearance, thus providing the opportunity of being able to undertake the clearance check at any time.

SUMMARY OF THE INVENTION

This object is achieved with a device which includes a measurement rail made of a springy elastic material having internal stiffness, which can be introduced by means of a guide rail, provided with a grip-type handle, into the gap between the outer bearing and the inner bearing and hence into the clearance measurement region, with a measurement probe located at its free end for the clearance width measurement, wherein the measurement rail with the measurement probe with a prescribed thickness are exchanged for measurement rails with measurement probes with other thicknesses until an agreement of the clearance width with the thickness of a measurement rail with the measurement probe is attained.

Accordingly a device of the generic kind is characterised by a measurement rail made of a springy elastic material having internal stiffness, which can be introduced by means of a guide rail, provided with a grip-type handle, into the gap between the outer bearing and the inner bearing and hence into the clearance measurement region, with a measurement probe located at its free end for the clearance width measurement, wherein the measurement rail with the measurement probe with a prescribed thickness are exchanged for measurement rails with measurement probes with other thicknesses until an agreement of the clearance width with the thickness of a measurement rail with the measurement probe is attained.

With a device configured in this manner in accordance with the invention the opportunity exists of reliably checking and measuring the clearance of the rudder shaft in its bearing region in the rudder trunk using simple mechanical means, wherein in particular the checking measurements can be carried out by divers underwater, so that there is no longer any requirement for the ship to be located in a dry dock. The further advantage exists in that these checking measurements can be undertaken at any time.

The operation of the device is simple. The measurement rail, movably supported on the guide rail, with the measurement probe located at its free end, is pushed through an opening in the wall of the rudder blade of the rudder to the extent that the bent end of the guide rail comes to lie in the internal space of the rudder blade. Hereupon the measurement rail, which preferably has twice the length of the guide rail, is pushed into the gap between the two bearings of the rudder shaft and the rudder trunk, until the measurement probe at the end of the measurement rail comes to lie in the clearance measurement region. If it is thereby established that the clearance has a greater width compared with the total thickness of the measurement rail and the measurement probe, measurement rails with measurement probes with other total thicknesses continue to be introduced until the clearance width corresponds to the total width of the inserted measurement rail with the measurement probe, so that by means of the values prescribed by the measurement rails and their measurement probes the width of the clearance can be measured accurately. For these measurements a number of measurement rails with their measurement probes are available with different thicknesses.

Advantageous embodiments of the invention are the subject of the dependent claims.

In accordance with a further form of embodiment the invention envisages a device that comprises the guide rail, provided with a grip-type handle, with at its free end a guide rail section bent in a curve, and the measurement rail, movable on the guide rail, and turned in the region of the bent guide rail section, and which can also be introduced into the gap between the outer bearing and the inner bearing and hence into the clearance measurement region, the measurement rail being made of a springy elastic material having internal stiffness with a measurement probe located at its free end for the clearance width measurement. While the guide rail consists of a rigid material having a high internal stiffness, the measurement rail is manufactured from a springy elastic material and has nevertheless an appropriate internal stiffness such that the measurement rail, guided on the guide rail, can be turned in a curve in the bent guide rail section such that the measurement rail can be moved from the horizontal into a vertical position, wherein in the end position of the measurement rail the latter is still held by the guide rail.

The further embodiment of the device envisages that the guide rail exists with the grip-type handle configured at one end and with the guide rail section configured at the other end to be curved with an angle of preferably 45°, wherein the guide rail has a number of frame-type retainers and a turning roller located on the inner wall side of the bent guide rail section, such that for the guidance of the measurement rail on the guide rail the measurement rail is retained on the guide rail by means of the frame-type retainers. In the end region of the guide rail the measurement rail is guided between the turning roller and the bent guide rail end section and bent through preferably 45° approximately, such that the end of the measurement rail with the measurement probe can be introduced into the gap between rotor shaft and rudder trunk in the journal bearing region. The measurement rail is guided in a bent guide rail section between the latter and the turning roller such that the measurement rail is guided out of the end of the bent guide rail section at an approximate right angle, wherein the measurement rail carries the measurement probe at its free end of the bent measurement rail section, the probe consisting of a plate-shaped body whose thickness plus the material thickness of the guide rail is a measure for the width of the journal bearing clearance.

The measurement rail held and guided on the guide rail with the measurement probe having a prescribed thickness can be exchanged for measurement rails with measurement probes of other thicknesses.

In order to be able to introduce the measurement rail into the gap for the clearance measurement, the measurement rail has a length that is greater than the length of the guide rail. Both the measurement rail and also the measurement probe consist preferably of plastic or another suitable material.

In contrast the guide rail consists of an inflexible, hard and rigid material.

The measurement probe on the measurement rail is joined to the latter either permanently or detachably, so that in the latter form of embodiment the measurement probes on the measurement rails can be exchanged for measurement probes of other thicknesses.

Furthermore the invention envisages a method for the execution of checks and the measurement of the journal bearing clearance between the outer bearing on the rudder shaft of a rudder for water-borne craft and the inner bearing on the rudder trunk corresponding with the outer bearing, using the device previously described, in which the guide rail with an attached measurement rail with its bent end section is inserted into an opening in the outer wall of the rudder blade of the rudder to the extent that the bent guide rail end section comes to lie in the lower region of the gap between the outer bearing on the rudder shaft of the rudder for water-borne craft and the inner bearing on the rudder trunk, whereupon the measurement rail on the guide rail is inserted into the gap to the extent that the measurement probe of the measurement rail comes to lie in the clearance measurement region, wherein measurement rails with measurement probes continue to be exchanged on the guide rail for measurement rails with measurement probes of other thicknesses until the thickness of the measurement rail together with the thickness of the measurement probe corresponds to the width of the clearance.

BRIEF DESCRIPTION OF THE DRAWINGS

In the drawing are illustrated exemplary embodiments of the invention, and in particular.

DESCRIPTION OF THE PREFERRED EMBODIMENTS

For the form of embodiment shown in FIGS. 1, 2, 3 and 4 a body of a ship is indicated by 10, a rudder blade of a rudder by 15, a rudder trunk by 20 and a rudder shaft by 25.

The rudder trunk 20, configured as a cantilever, is connected securely at its upper end 20a to the body of the ship indicated by 10 which extends in the lengthwise direction of the rudder trunk and which accommodates the rudder shaft 25. The rudder trunk 20 is guided into the rudder blade 15, which is securely connected to the free lower end of the rudder shaft 25 that is guided through the internal bore of the rudder trunk 20.

Figure 1:
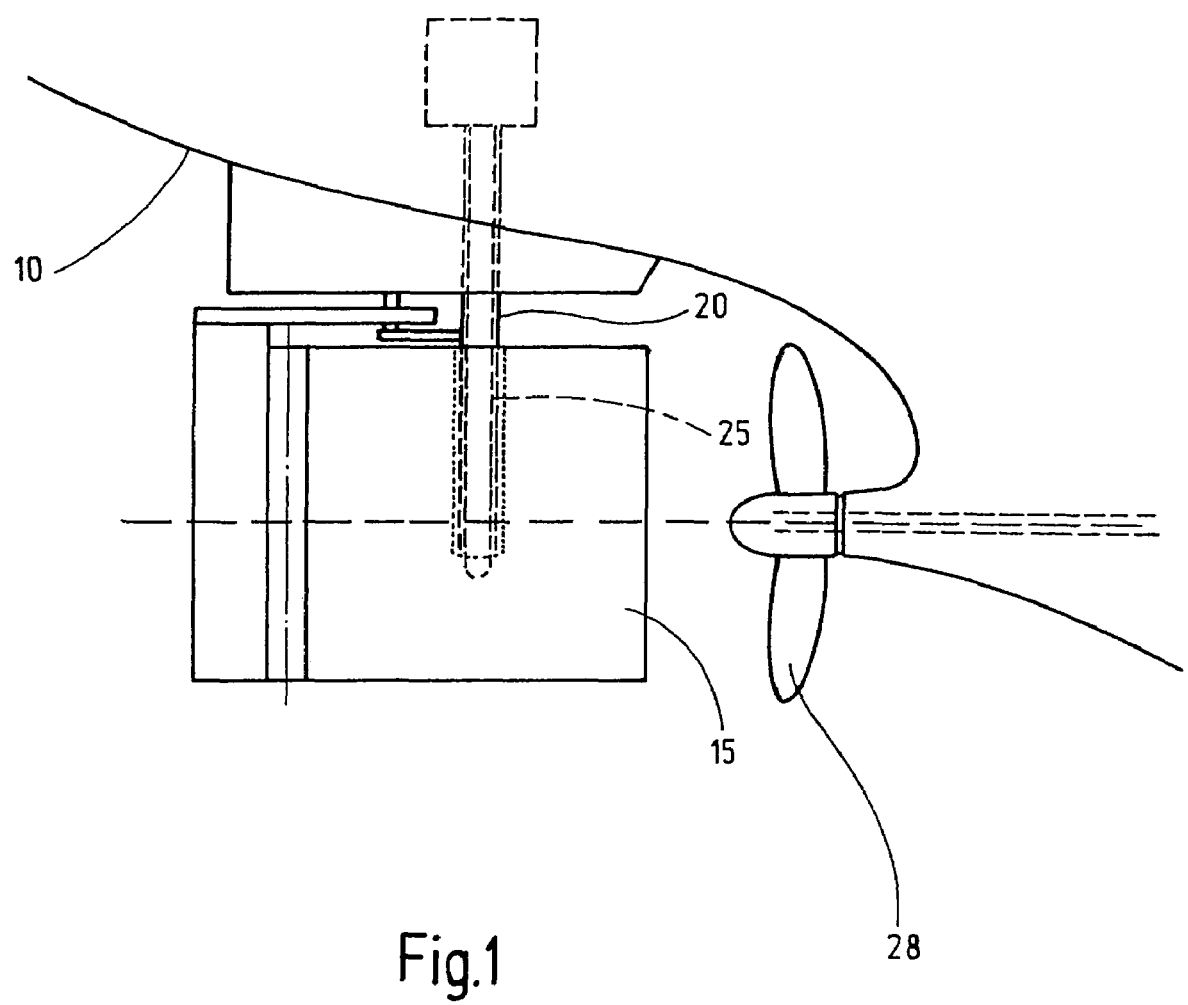
FIG. 1 shows a side view of a rudder arrangement provided in the stern region with a propeller that relates to the rudder blade.
Figure 2:
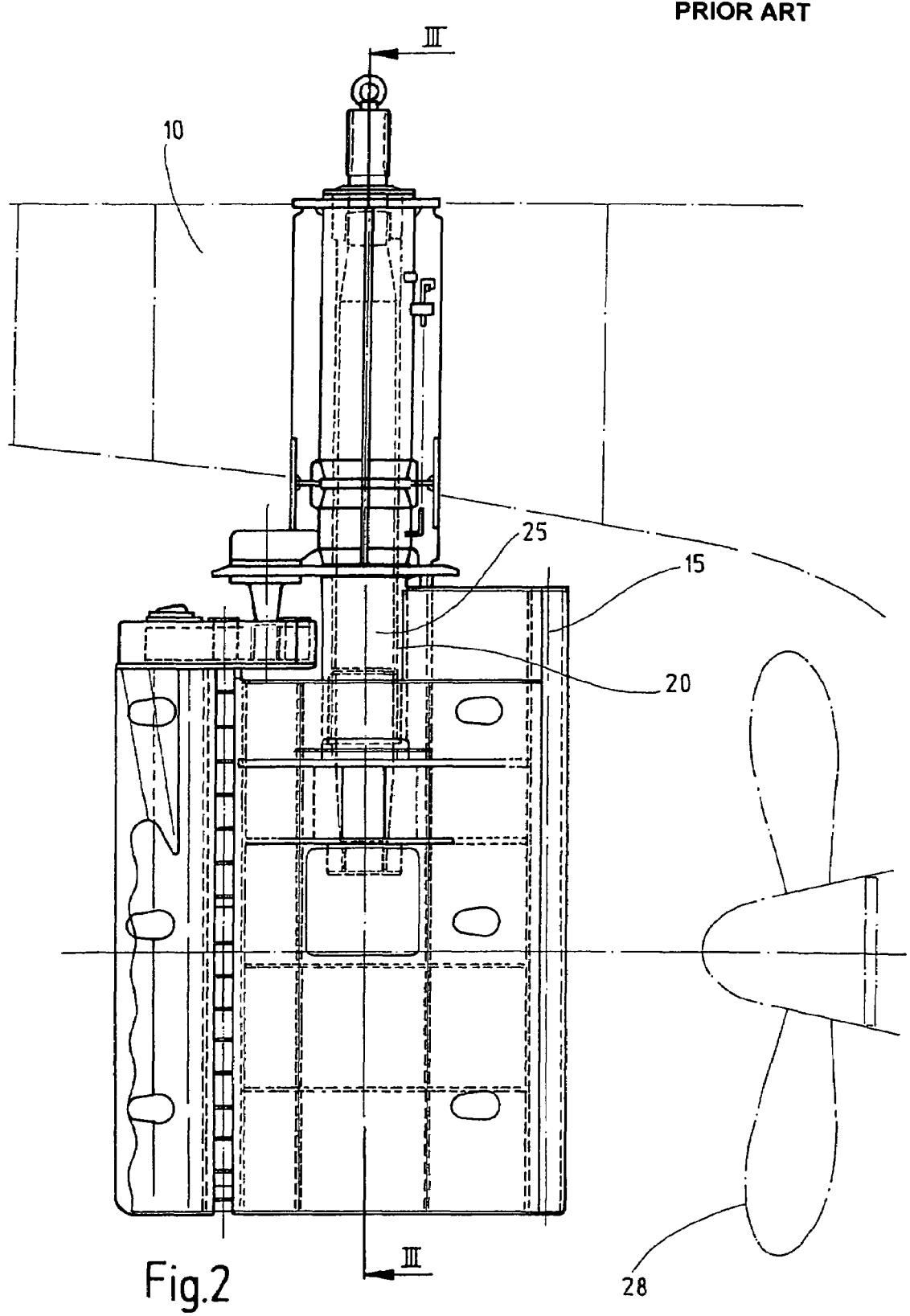
FIG. 2 shows an enlarged illustration of the rudder configuration with the rudder shaft located and supported in the rudder trunk.
Figure 3:
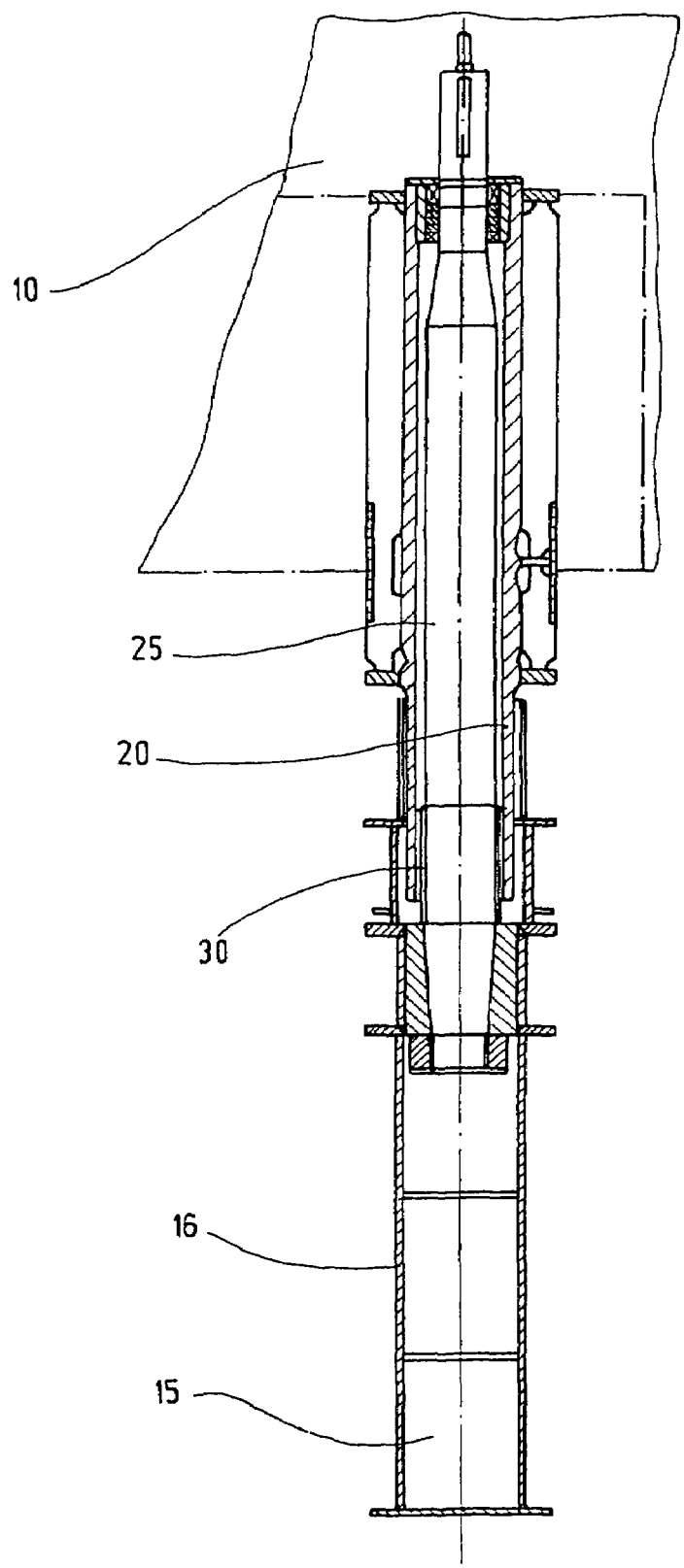
FIG. 3 shows a vertical section along the line III-III in FIG. 2.
Figure 4:
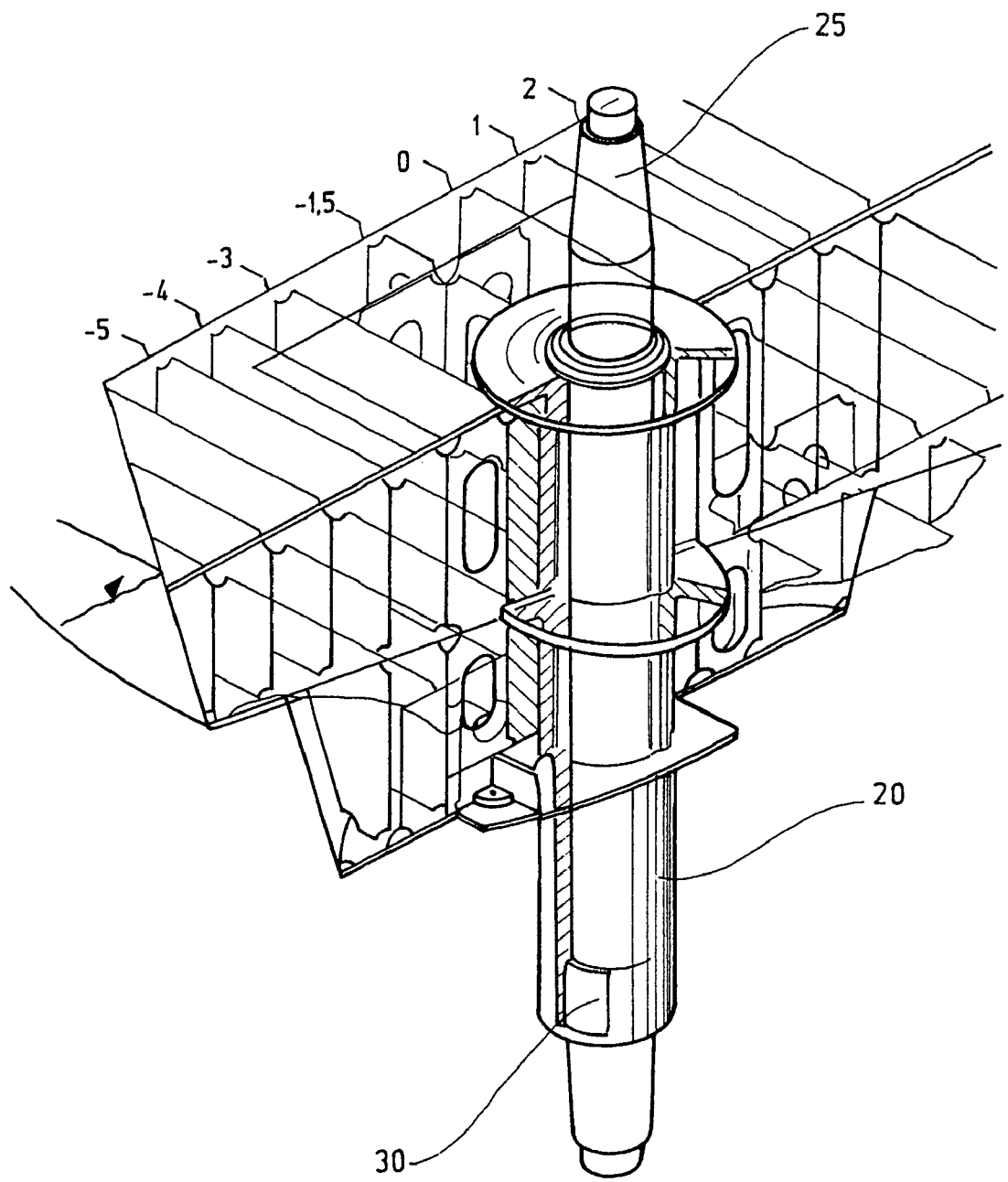
FIG. 4 shows a schematic sectional illustration of part of a stern with the rudder shaft located in the rudder trunk and the bearing for the rudder shaft.
Figure 14:
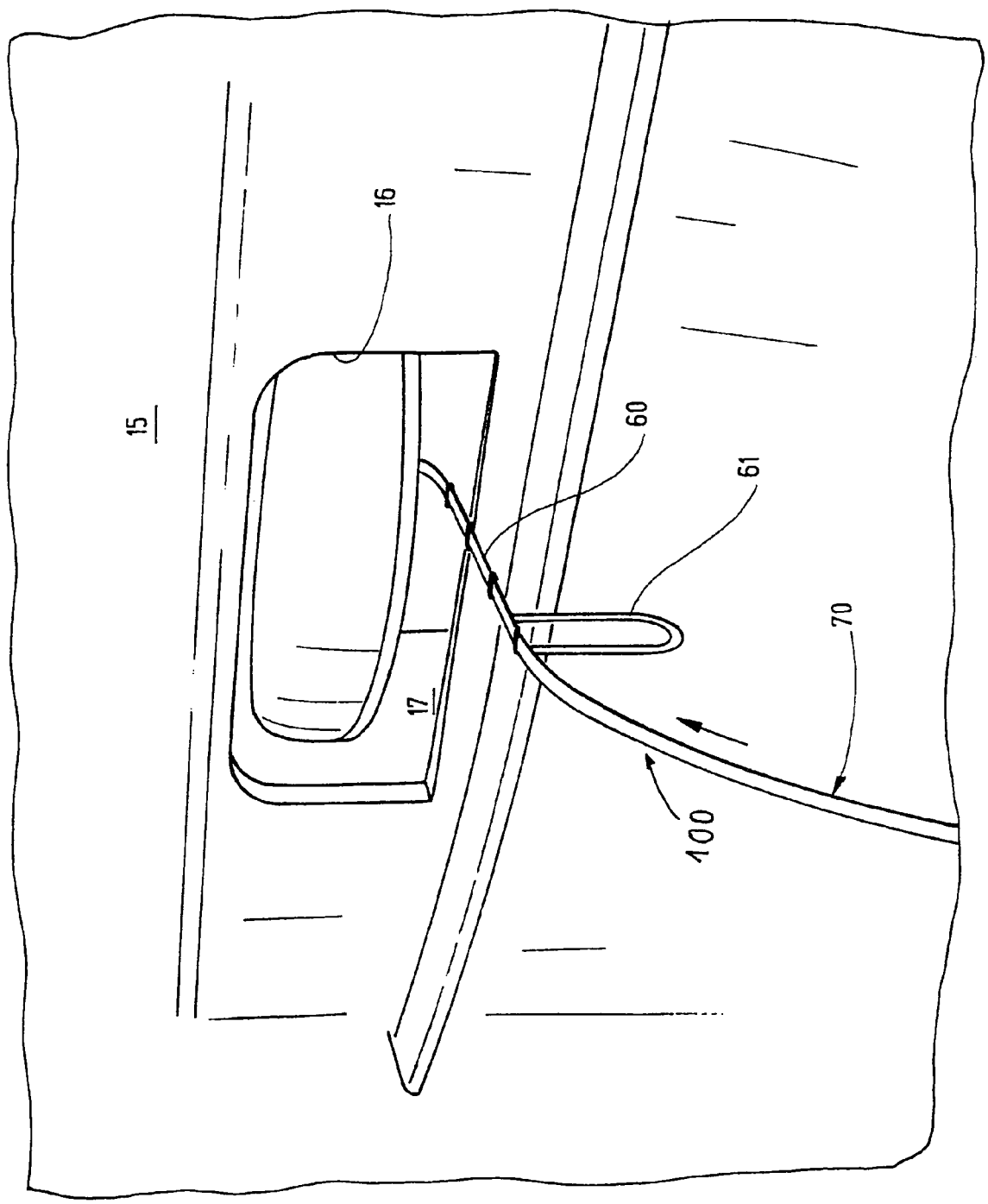

A propeller 28 relates to the rudder blade 15 of the rudder (FIGS. 1 and 2). As FIG. 14 shows at least one opening 17 is provided in the outer wall 16 of the rudder blade 15.

Figure 5:
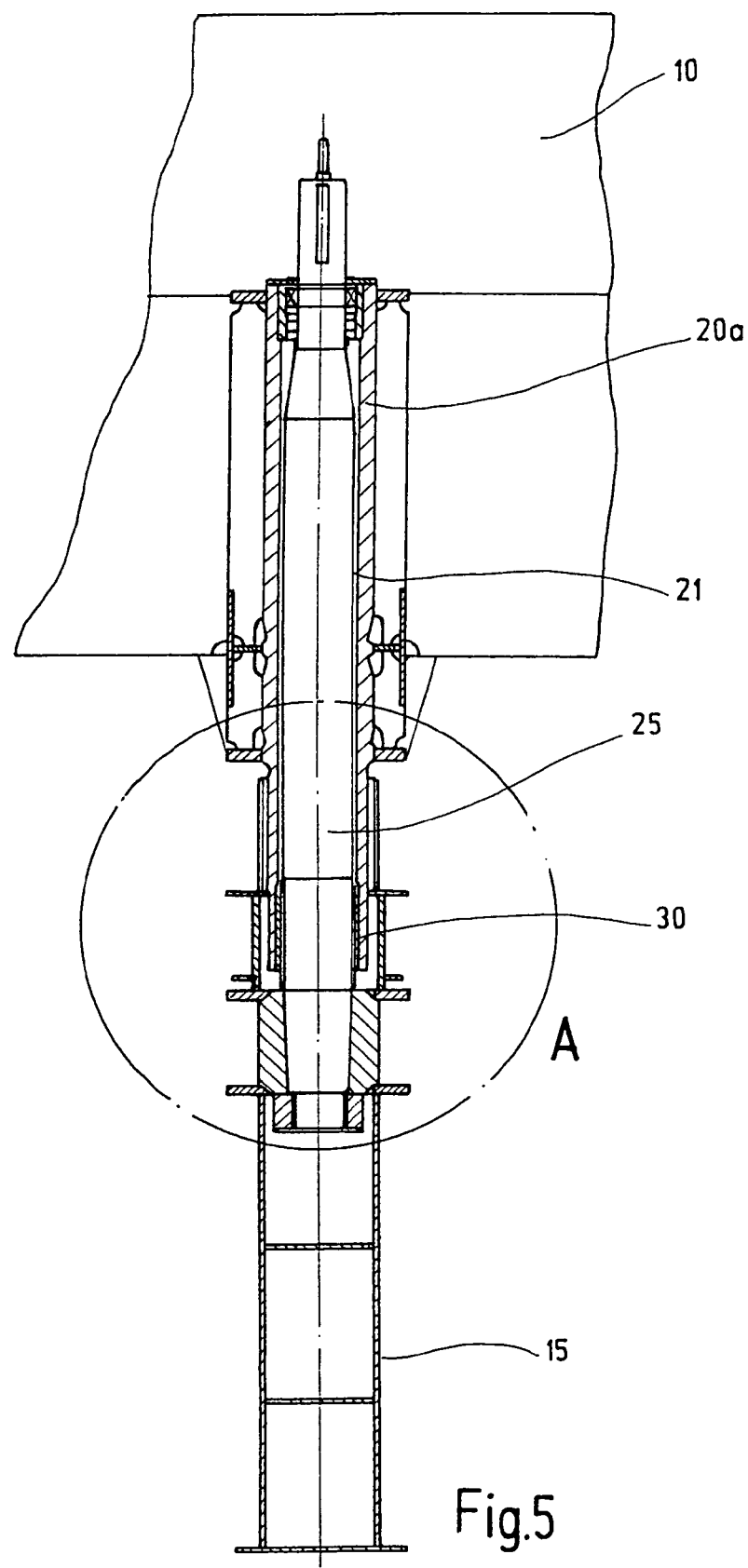
FIG. 5 shows a vertical lengthwise section through the rudder shaft with the rudder trunk.
Figure 6:
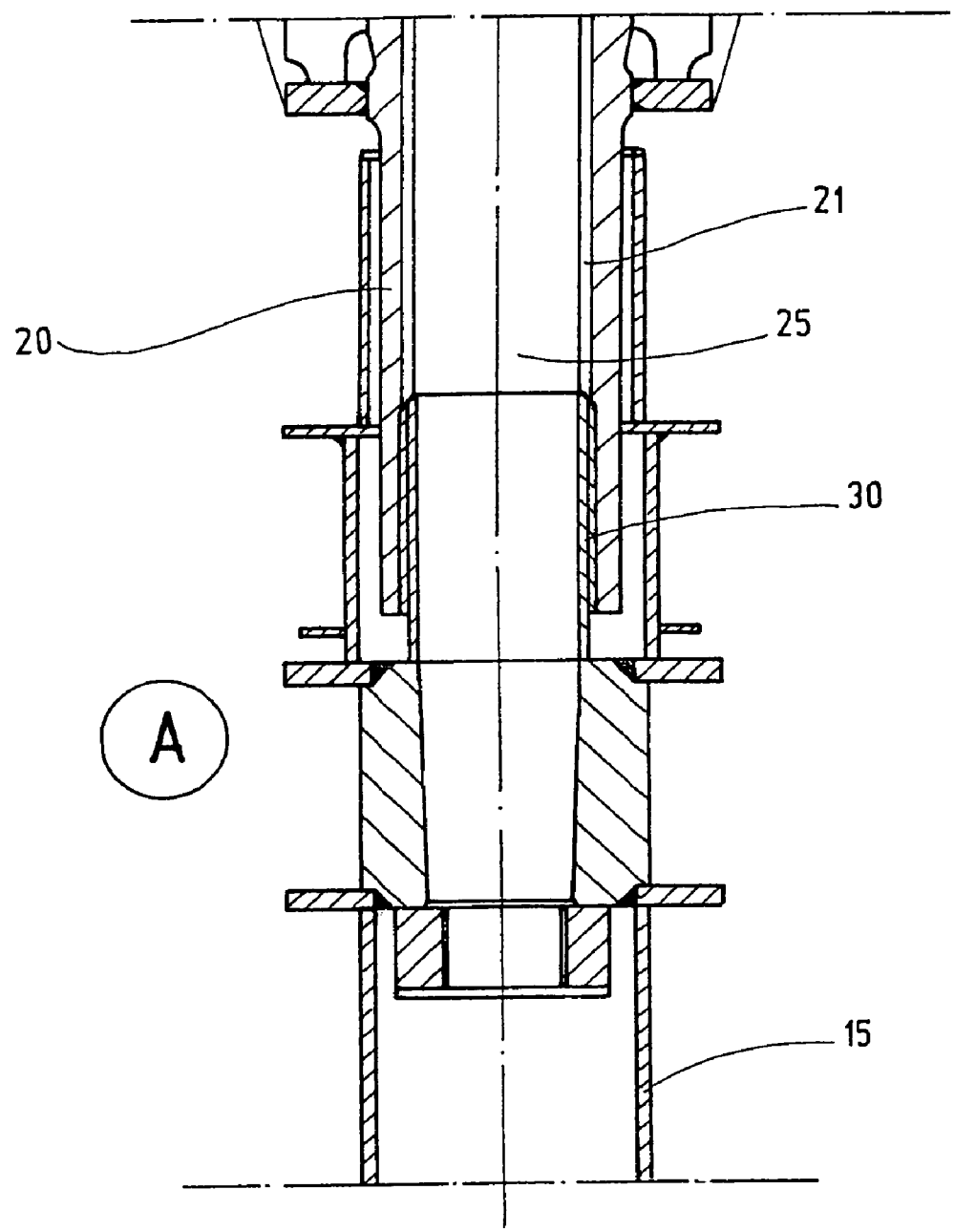
FIG. 6 shows an enlarged illustration of section A of the rudder shaft supported in the rudder trunk.
Figure 7:
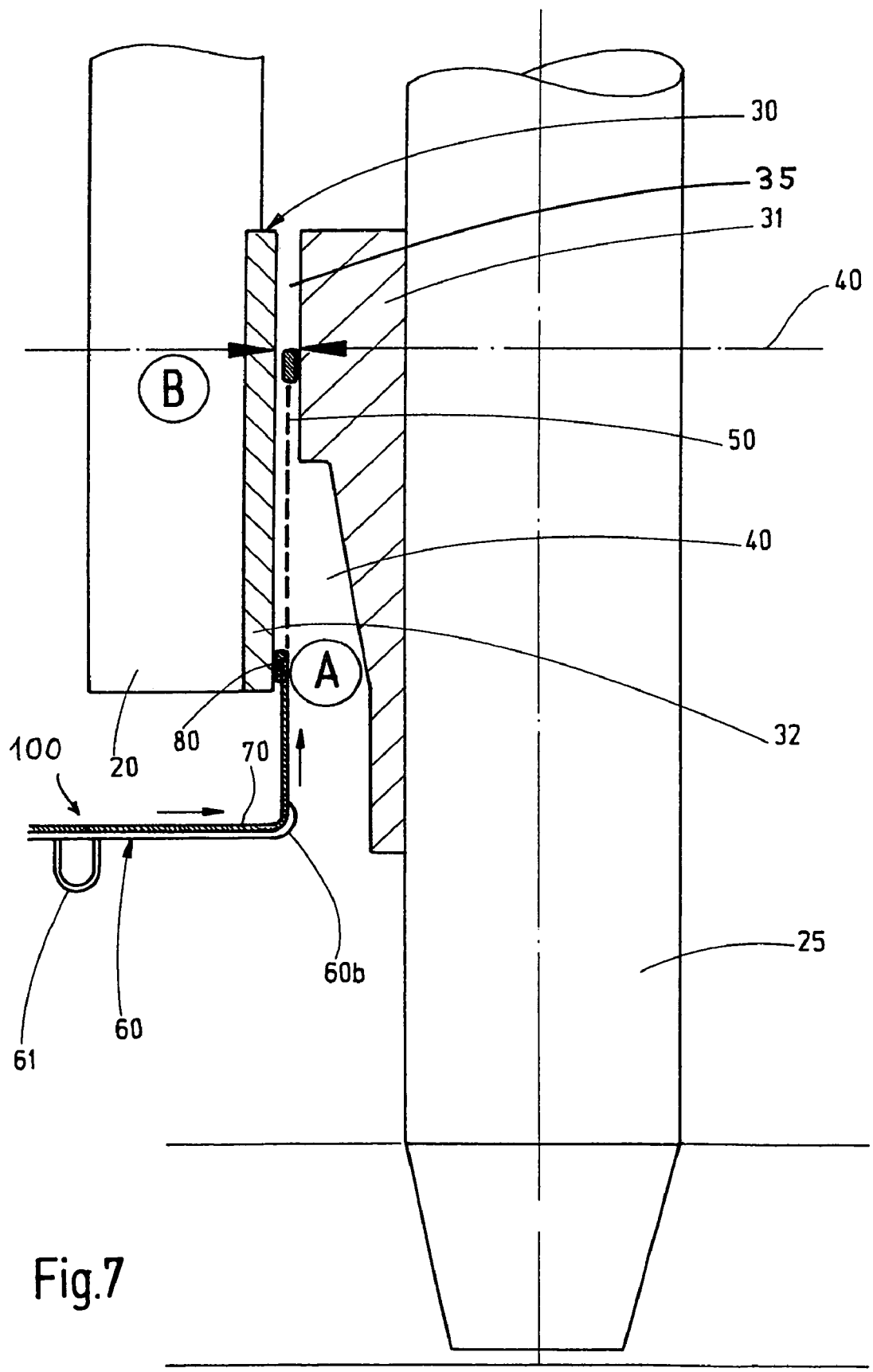
FIG. 7 shows partly in view, partly in an enlarged vertical section, the rudder shaft supported in the rudder trunk with the gap between the two bearing parts with the clearance measurement region indicated and with the device brought into the working position in accordance with the invention, made up of a guide rail with a measurement rail to be guided and held on the latter with a measurement probe provided at one end.

For the support of the rudder shaft 25 in the rudder trunk 20 a bearing 30 is provided in the lower region of the rudder shaft 25, the bearing being made up from an outer bearing located on the rudder shaft 25 and an inner bearing located on the inner wall side of the rudder trunk 20, wherein the inner bearing is securely located as a bushing in the rudder shaft 20 (FIGS. 5, 6 and 7). Between the outer bearing 31 and the inner bearing 32 a gap 35 is formed, in which the device 100 configured in accordance with the invention can be introduced, in order to be able to check and measure the clearance between the rotor shaft 25 and the rudder trunk 20. In FIG. 7 the clearance measurement region is indicated by 40 and the journal bearing clearance by 50.

In accordance with FIGS. 8, 9, 10, 11 and 12 the device 100 for checking and measuring the journal bearing clearance 50 between the outer bearing 31 on the rudder shaft 25 and the inner bearing 32 corresponding with the outer bearing 31 on the rudder trunk 20 consists of a guide rail 60 and a measurement rail 70 that is movably located and held on this guide rail, and which at its free end carries a measurement probe 80.

The guide rail 60 has adjacent to one of its free ends 60d a grip-type handle 61. The other free end 60a is bent, preferably at an angle of 45°, so that the free end 60a of the bent guide rail section 60b is at right angles to the guide rail section 60c, wherein the guide rail section 60c has a greater length compared with the bent guide rail section 60b.

Figure 8:
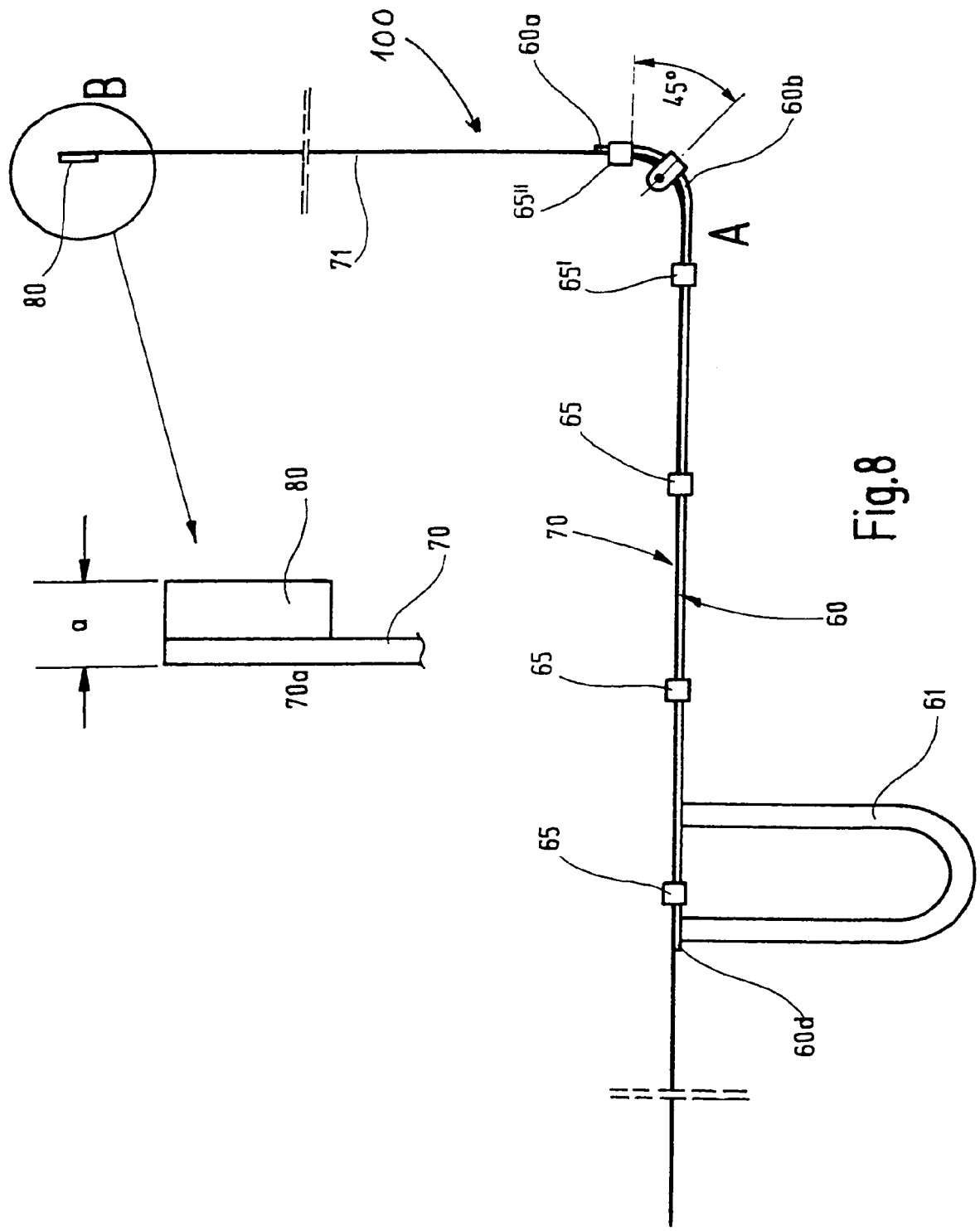
FIG. 8 shows a side view of the guide rail in its working position with a measurement rail held on the latter with a measurement probe fixed at one end and with a bent measurement rail section.
Figure 9:
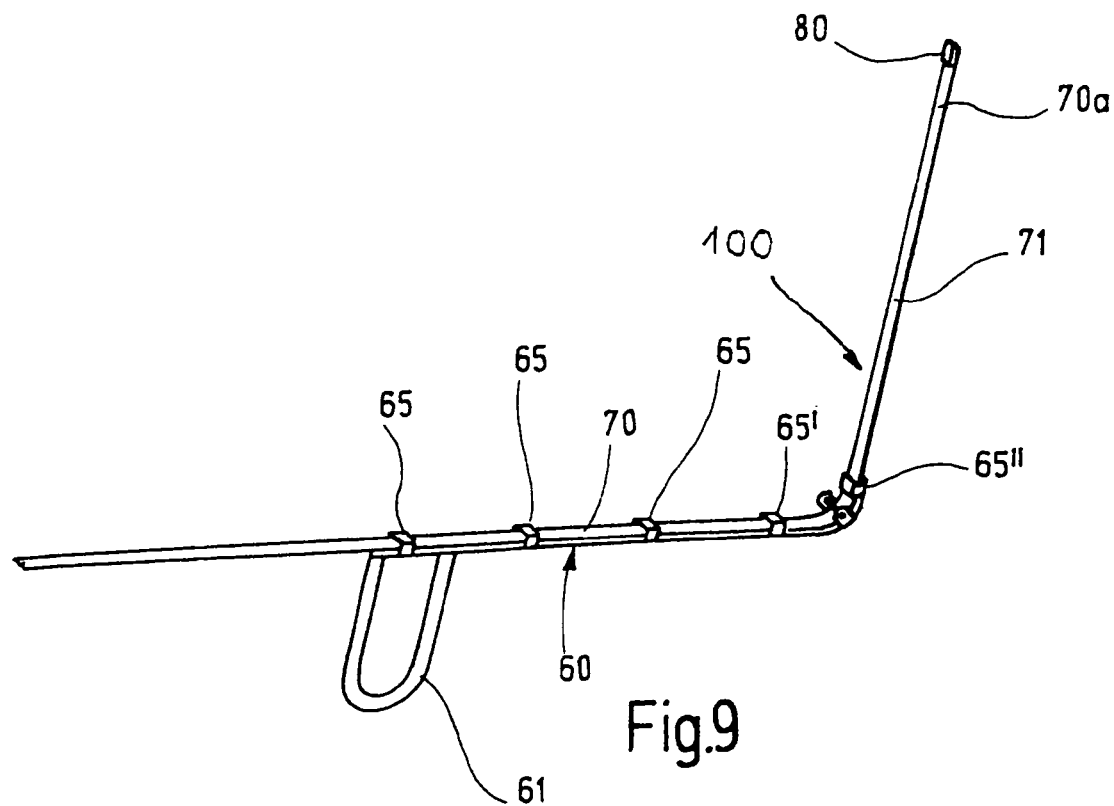
FIG. 9 shows a reduced schematic illustration of the device illustrated in FIG. 8.

The guide rail 60 consists of a rigid, i.e. inflexible material, e.g. of plastic, a metal or another suitable material, wherein the material for the guide rail 60 is in each case selected such that the guide rail has a high internal stiffness. The guide rail 60 consists preferably of a flat profile, wherein the guide rail 60 can also have other cross-section profiles. However, the guide rail 60 is always formed such that the measurement rail 70 consisting of a flat profile is movably held on the guide rail and can be moved in the guide rail lengthwise direction (FIG. 8). For the retention of the measurement rail 70 on the guide rail 60 the latter has a number of frame-type retainers 65, which are fitted on the guide rail such that the measurement rail 70 lying on the guide rail 60 is enclosed by these frame-type retainers 65 (FIGS. 8, 9, 11 and 12).

The measurement rail 70, which similarly has a flat profile, consists of a springy elastic material that has a certain internal stiffness, preferably of plastic, however, other suitable materials can also be used.

Figure 10:
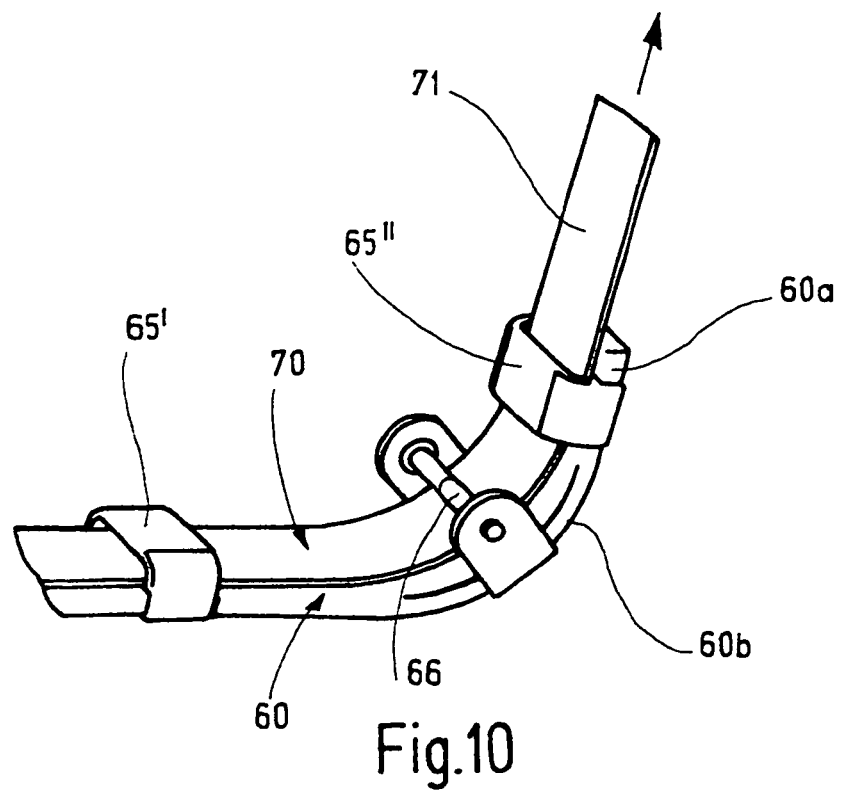
FIG. 10 shows an enlarged reproduction of the guide rail section A in FIG. 8.
Figure 11:
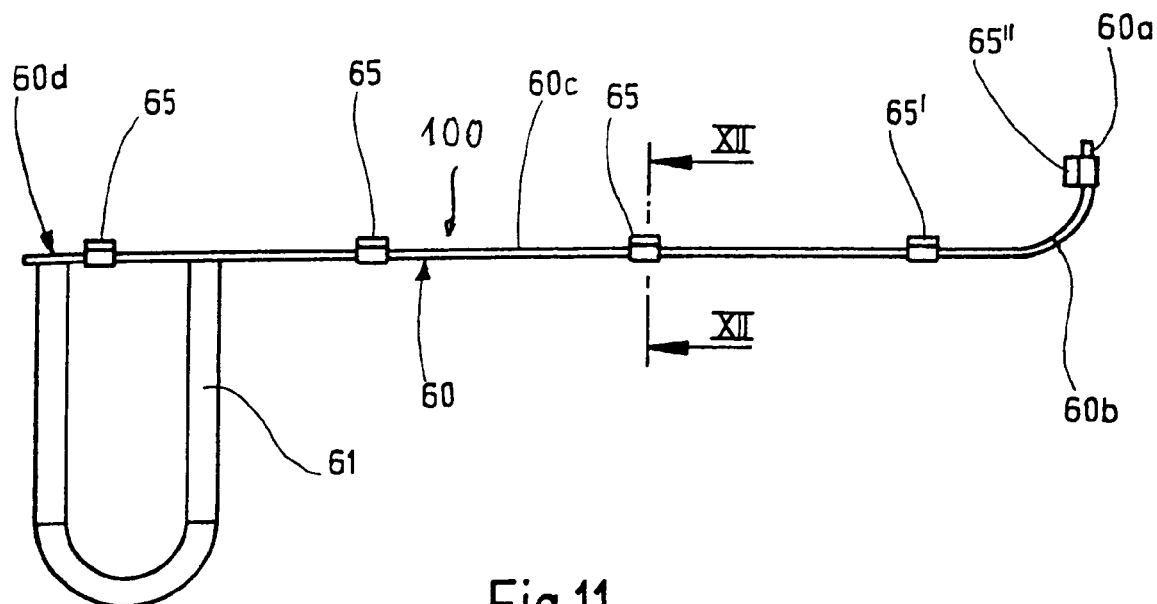
FIG. 11 shows a side view of the guide rail of the device in accordance with the invention.
Figure 12:
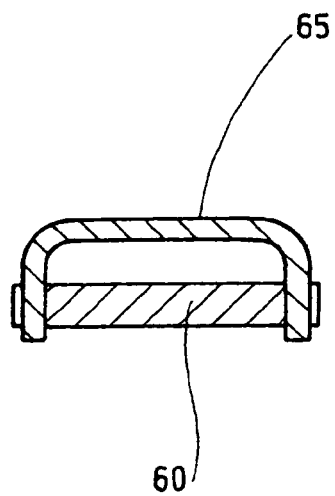
FIG. 12 shows an enlarged vertical section along the line XII-XII in FIG. 11.

The width of the measurement rail 70 corresponds approximately in width to the guide rail 60, so that the measurement rail 70 can be pushed through the openings formed by the frame-type retainers 65 of the guide rail 60. The free end 70a of the measurement rail 70 carries a measurement probe 80, which is configured as a plate-shaped body 81 and is fitted to the measurement rail 70 either permanently or detachably. Since the measurement rail 70 consists of a springy elastic material, the possibility exists that the measurement rail 70 located on the guide rail 60 can in the bent guide rail section 60b be curved in the same manner as the guide rail section 60b is curved (FIG. 10), wherein the curved measurement rail section is indicated by 71. In order to achieve guidance and turning of the measurement rail 70 in the bent guide rail section 60b, a turning roller 66 is located in the region of the bent guide rail section 60b between the two frame-type retainers 65', 65" on the inner wall side, so that the measurement rail can be guided and moved between this turning roller 66 and the guide rail 60 in the bent guide rail section 60b in a manner corresponding to the curve-shaped characteristic of this section (FIGS. 10 and 11). In the operational state of the device 100 the measurement rail is turned in the region of the bent guide rail section 60b of the guide rail 60 so that with a further push the measurement rail can be introduced into the gap between the outer bearing 31 and the inner bearing 32 and hence into the clearance measurement region 40. The clearance width measurement then takes place by means of the measurement probe 80 on the measurement rail 70, wherein the total thickness of the thickness of the material of the measurement rail 70 and the thickness of the measurement probe 80 corresponds to the width of the clearance 50 to be measured. The thickness of the measurement probe 80, or, in other words, the thickness of its plate-shaped body 81 and the material thickness of the measurement rail 70 then form a measure for the width of the journal bearing clearance 50 (FIG. 7).

Figure 13:
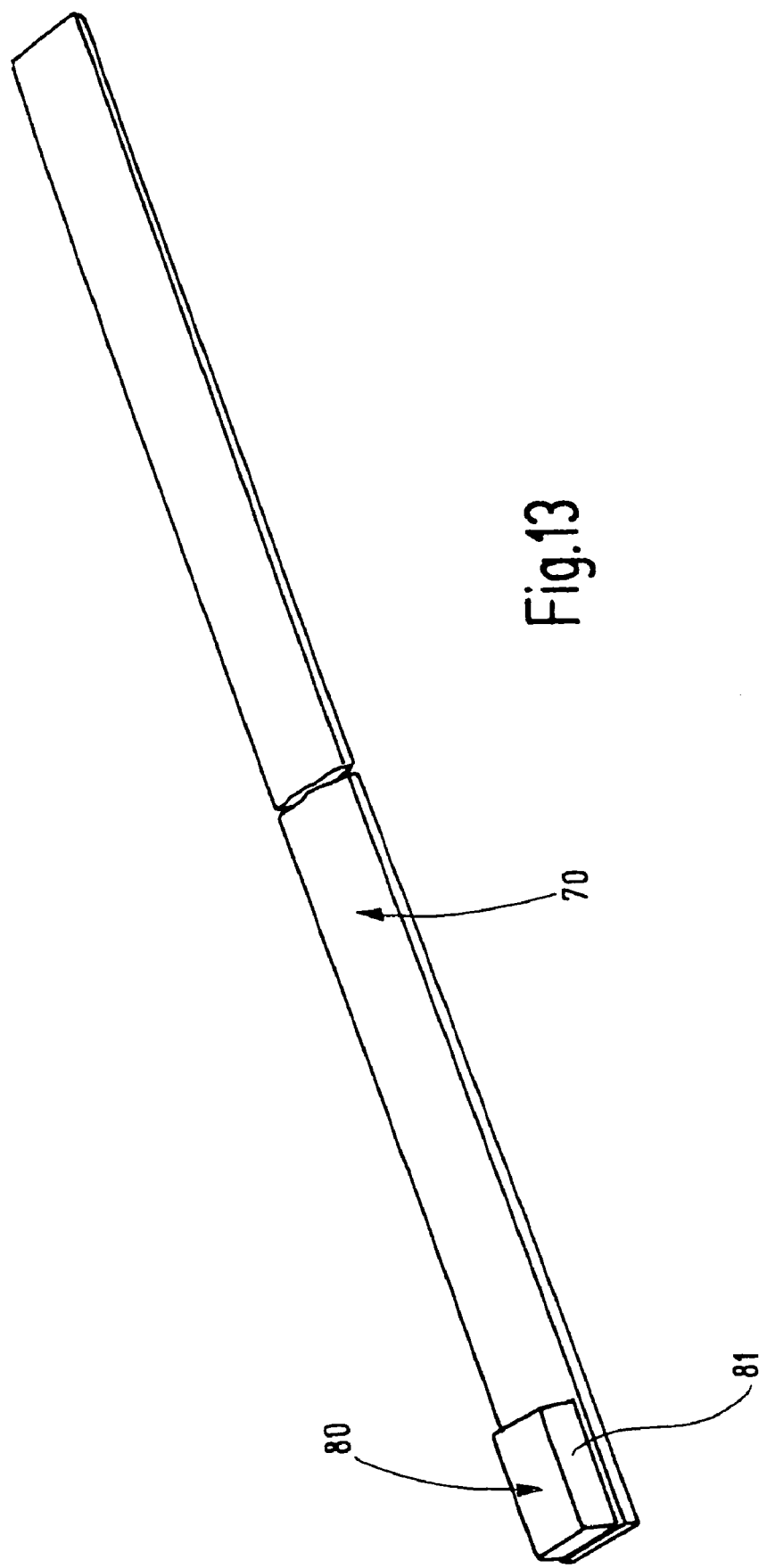
FIG. 13 shows a schematic illustration of a measurement strip with a measurement probe located at one end and FIG. 14 shows a schematic view of a section of the rudder blade with a device configured in accordance with the invention introduced into its internal space.

The measurement rail 70 held on the guide rail 60 can be exchanged together with the guided measurement probe 80 with a prescribed thickness for measurement rails 70 with measurement probes 80 of other thicknesses. FIG. 13 shows a measurement rail 70 of this kind with a measurement probe 80 located at one end. For the measurement of the journal bearing clearance 50 a number of measurement rails 70 with measurement probes 80 are available, which have different thicknesses, such that after the introduction of a plurality of measurement rails 70 with measurement probes 80 having different thicknesses a final measurement rail with a measurement probe inserted into the gap then fills the clearance so that the prescribed total thickness a of the measurement rail with the measurement probe is then a measure for the width of the journal bearing clearance 50 (FIG. 8).

The measurement rail 70 or measurement rails have a length that is much greater than the length of the guide rail 60, such that a sufficient length of measurement rails 70 is available in order to be able to push the measurement probe 80 into the clearance measurement region 40.

The device 100 configured in accordance with the invention is used as follows:

For the insertion of the measurement rail 70 with a measurement probe 80 of arbitrarily selected total thickness a the insertion is made via the bent guide rail section 60b of the guide rail 60 into the guide rail 60 such that by the loop-shaped retainers 65, 65', 65" and the turning roller 66 the measurement rail 70 comes to lie on the inner wall side of the guide rail 60, so that the free end 70a of the measurement rail 70 together with the measurement probe 80 projects out of the end of the guide rail 60. In this position the guide rail 60 with the measurement rail 70 is introduced by means of the grip-type handle 61 into an opening 17 in the outer wall 16 of the rudder blade 15, wherein the guide rail 60 assumes a horizontal position (FIG. 14). The bent guide rail section 60b of the guide rail 60 then lies in the internal space of the rudder blade 15 and in particular in the region of the clearance 35 between the outer bearing 31 and the inner bearing 32 of the bearing 30 (FIG. 7). In this position the measurement rail 70 is then pushed on the guide rail 60 so that the free end of the measurement rail 70 with the measurement probe 80 is moved from position A into position B, until the clearance measurement region 40 is reached. If it is established that with the selected measurement rail 70 with its measurement probe 80 a certain clearance still exists in the gap 35 between the outer bearing 31 and the inner bearing 32, the measurement rail 70 is then exchanged for a measurement rail with a measurement probe 80 whose total thickness a is then selected to be larger, wherein measurement rails with measurement probes continue to be exchanged until one measurement rail 70 with a measurement probe 80 completely fills the clearance that is being measured, wherein the total thickness of the measurement rail 70 with the measurement probe 80 then corresponds to the width of the clearance. Since a number of measurement rails 70 with measurement probes of different total thicknesses are available the width of the clearance can be measured without difficulty by means of the appropriate choice of the measurement rail with the measurement probe.

The device 100 in accordance with the invention is particularly suitable for use in checking and measuring the journal bearing clearance of rudders for water-borne craft, in particular for water-borne craft lying in dock or on the water by means of personnel working on the surface or underwater.

REFERENCE NUMERALS

| | |
|---|---|
| 10 | ship body |
| 15 | rudder blade |
| 16 | outer wall |
| 17 | opening |
| 20 | rudder trunk |
| 20a | upper end |
| 21 | inner bore |
| 25 | rudder shaft |
| 28 | propeller |
| 30 | bearing |
| 31 | outer bearing |
| 32 | inner bearing |
| 35 | clearance |
| 40 | clearance measurement region |
| 50 | journal bearing clearance |
| 60 | guide rail |
| 60a | free end |
| 60b | bent guide rail section |
| | inner wall side |

| | |
|---|---|
| 60c | guide rail section |
| 60d | free end |
| 60f | guide rail section |
| 61 | grip-type handle |
| 65 | frame-type retainer |
| 65' | frame-type retainer |
| 65" | frame-type retainer |
| 66 | turning roller |
| 70 | measurement rail |
| 70a | free end |
| 71 | bent measurement rail section |
| 80 | measurement probe |
| 81 | plate-shaped body |
| 100 | device |

The invention claimed is:

1. A device (100) for the checking and measurement of the journal bearing clearance (50) between the outer bearing (31) on the rudder shaft (25) of a rudder for water-borne craft and the inner bearing (32) on the rudder trunk (20) corresponding with the outer bearing (31), comprising a measurement rail (70) made of a springy elastic material having internal stiffness, which can be introduced by means of a guide rail (60), provided with a grip-type handle (61), into the gap (35) between the outer bearing (31) and the inner bearing (32) and hence into the clearance measurement region (40), with a measurement probe (80) located at its free end (70a) for the clearance width measurement, wherein the measurement rail (70) with the measurement probe (80) with a prescribed thickness (a) are exchanged for measurement rails with measurement probes with other thicknesses until an agreement of the clearance width with the thickness of a measurement rail (70) with the measurement probe (80) is attained.

2. The device according to claim 1, wherein the device (100) includes the guide rail (60), provided with a grip-type handle (61), with at its free end (60a) a guide rail section (60b) bent in a curve, and the measurement rail (70), movable on the guide rail (60), and turned in the region of the bent guide rail section (60a), which can also be introduced into the gap (35) between the outer bearing (31) and the inner bearing (32) and hence into the clearance measurement region (40), made of a springy elastic material having internal stiffness, with the measurement probe (80) located at its free end (70a) for the clearance width measurement.

3. The device according to one of the claim 1, wherein the device (100) consists of the guide rail (60), with the grip-type handle (61) configured at one end, and with the guide rail section (60b) configured at the other end (60a) to be curved with an angle of preferably 45°, wherein the guide rail (60) has a number of frame-type retainers (65) and a turning roller (66) located on the inner wall side of the bent guide rail section (60b), and of the measurement rail (70) held by the loop-shaped retainers (65) of the guide rail (60) and movably held on its inner wall surface (60c) in the guide rail lengthwise direction and in the region of the bent guide rail section (60b) between the latter and the turning roller (66) guided in such a manner that the measurement rail (70) is guided out of the end (60a) of the bent guide rail section (60b) at an approximate right angle, wherein the measurement rail (70) at its free end (70a) of the measurement rail section (71) that is bent in the working position of the device (100), carries the measurement probe (80), which consists of a plate-shaped body (81), whose material thickness plus the material thickness of the measurement rail (70) is a measure for the width of the journal bearing clearance (50).

4. The device according to claims 1, wherein the measurement rail (70) held and guided on the guide rail (60) with the measurement probe (80) having a prescribed thickness can be exchanged for measurement rails (70) with measurement probes (80) of other thicknesses.

5. The device according to claim 1, wherein the measurement rails (70) have a length that is greater than the length of the guide rail (60).

6. The device according to claim 1, wherein the measurement probe (80) consists of plastic or another suitable material.

7. The device according to claim 1, wherein the guide rail (60) consists of an inflexible material.

8. The device according to claim 1, wherein the measurement probe (80) on the measurement rail (70) is permanently connected to the latter.

9. The device according to claim 1, wherein the measurement probe (80) on the measurement rail (70) is detachably connected to the latter.

10. The device according to claim 1, wherein the measurement probe (80) on the measurement rail (70) can be exchanged for measurement probes with other thicknesses.

11. The device according to claim 1, wherein the guide rail (60) and the measurement rail (70) consist of flat profiles.

12. A method for the execution of checks and measurement of the journal bearing clearance (50) between the outer bearing (31) on the rudder shaft (25) of a rudder for water-borne craft and the inner bearing (32) on the rudder trunk (20) corresponding with the outer bearing (31), with use of a device (100) according to claim 1, wherein the guide rail (60) with a measurement rail (70) attached is inserted with its bent guide rail section (60b) into an opening (17) in the outer wall (16) of the rudder blade (15) of the rudder to the extent that the bent guide rail section (60b) of the guide rail (60) comes to lie in the lower region of the gap (35) between the outer bearing (31) on the rudder shaft (25) of the rudder for water-borne craft and the inner bearing (32) on the rudder trunk (20), whereupon the measurement rail (70) on the guide rail (60) is inserted into the gap (35) to the extent that the measurement probe (80) of the measurement rail (70) comes to lie in the clearance measurement region (40), wherein measurement rails (70) with measurement probes (80) continue to be exchanged for measurement rails with measurement probes of other thicknesses on the guide rail (60) until the thickness of the measurement rail (70) together with the thickness of the measurement probe (80) corresponds to the width of the clearance.

13. The use of a device (100) according to claim 1 for the checking and measurement of the journal bearing clearance of rudders for water-borne craft, in particular for water-borne craft lying in dock or on the water by means of personnel working on the surface or underwater.

* * * * *